US009667282B1

(12) United States Patent
Merlin et al.

(10) Patent No.: US 9,667,282 B1
(45) Date of Patent: May 30, 2017

(54) METHOD AND APPARATUS FOR ADAPTIVE GAIN CONTROL AND ANTENNA LOAD COMPENSATION

(71) Applicant: Samsung Electronics Co., Ltd., Gyeonggi-do (KR)

(72) Inventors: Marco Merlin, Valbonne (FR); Ian Appleton, Hertfordshire (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/053,463

(22) Filed: Feb. 25, 2016

(51) Int. Cl.
*H04B 1/04* (2006.01)

(52) U.S. Cl.
CPC .............. *H04B 1/0475* (2013.01); *H04B 1/04* (2013.01); *H04B 2001/0416* (2013.01)

(58) Field of Classification Search
CPC . H04B 1/0475; H04B 1/04; H04B 2001/0416
See application file for complete search history.

(56) References Cited

U.S. PATENT DOCUMENTS

| | | | | |
|---|---|---|---|---|
| 2005/0069050 | A1* | 3/2005 | Ding | H03C 3/40 375/296 |
| 2008/0139144 | A1* | 6/2008 | Behzad | H03G 3/3042 455/127.1 |
| 2010/0264984 | A1* | 10/2010 | Gomez | H03F 1/52 330/124 R |
| 2010/0317297 | A1* | 12/2010 | Kratochwil | H04W 52/0251 455/67.11 |
| 2012/0208476 | A1* | 8/2012 | Tanoue | H03F 1/0261 455/95 |
| 2015/0120219 | A1* | 4/2015 | Merlin | H04B 1/0458 702/58 |
| 2015/0236731 | A1* | 8/2015 | Ghannouchi | H04B 1/0475 375/296 |
| 2015/0349815 | A1* | 12/2015 | Matsubara | H04B 1/0475 375/297 |

* cited by examiner

*Primary Examiner* — Dac Ha
(74) *Attorney, Agent, or Firm* — The Farrell Law Firm, P.C.

(57) ABSTRACT

Methods and apparatuses are provided for adjusting a transmission gain in a transmitter of an electronic device. A transmitted signal is received at a digital signal processor (DSP) of the transmitter. The transmitted signal is also transmitted through a transmission path of the transmitter resulting in a load impedance. A looped-back signal is received at the DSP via a loop-back path of the transmitter that returns from the transmission path. The DSP estimates the load impedance from the transmitted signal and the looped-back signal. The DSP sets the transmission gain of the transmission path based on the load impedance and saturation values for a load current and a load voltage.

20 Claims, 2 Drawing Sheets

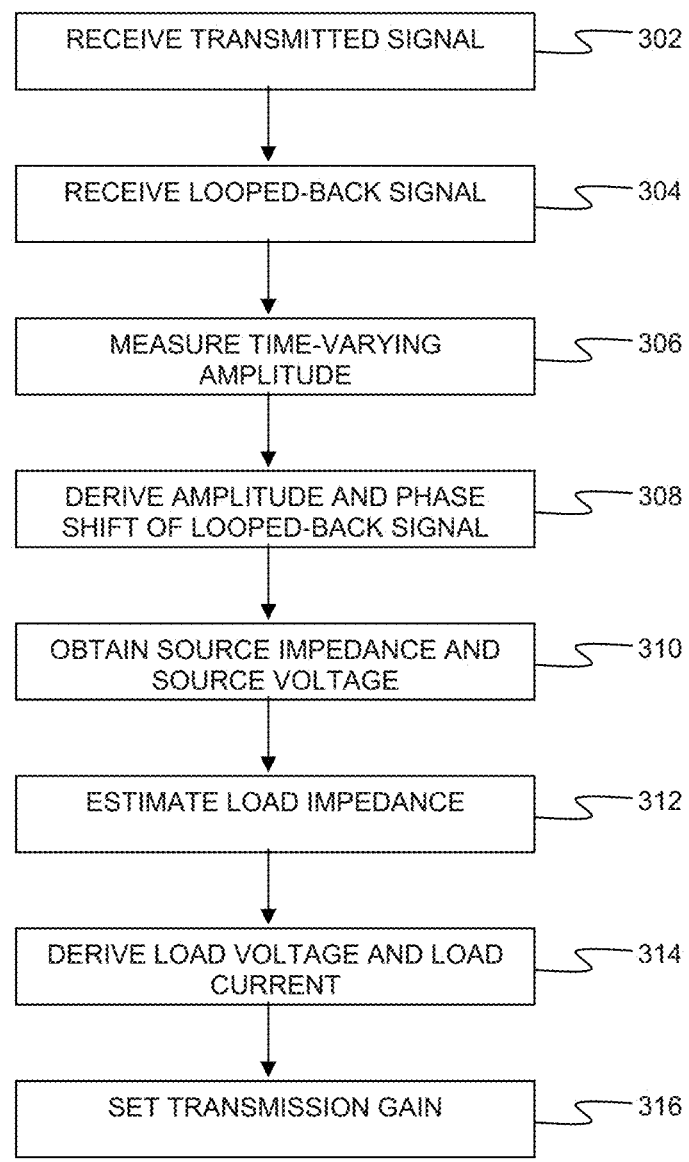

METHOD AND APPARATUS FOR ADAPTIVE GAIN CONTROL AND ANTENNA LOAD COMPENSATION

BACKGROUND

1. Field of the Disclosure

The present disclosure relates generally to adaptive gain control of a transmitter, and more particularly, to setting a transmission gain in a transmitter of an electronic device to maintain a constant Error Vector Magnitude (EVM) as the load impedance varies.

2. Description of the Related Art

A radio transmitter for mobile applications typically includes a source (e.g., a power amplifier) connected to a load (e.g., an antenna) via at least one of a filter and a switch. The amplifier is designed to provide best performance on a nominal load impedance of $(50+j0)\Omega$. However, the antenna is often exposed to conditions that disrupt its radiated electromagnetic field. Such conditions may include an object in close proximity to the antenna. These conditions cause the equivalent impedance of the load to diverge significantly from the nominal value.

In order to maximize power transfer from a source to a load in an electrical circuit, the load impedance must equal the complex conjugate of the source impedance. When the load impedance is not equal to the complex conjugate of the source impedance, the power transferred to the load is not optimal, which results in mismatch power loss.

Due to the intrinsic limitations in both voltage and current swing of the amplifier, load mismatch may also cause distortion of the transmitted signal. Distortion is often measured in terms of EVM, and causes a reduction in the Signal-to-Noise Ratio (SNR) at the receiver end. This distortion, and resulting reduced SNR, causes the received signal to be unintelligible, and may eventually cause the link to fail.

Traditionally, in dealing with antenna mismatch, an isolator is inserted between the power amplifier and the antenna. The purpose of the isolator is to prevent the power reflected from the mismatched load to enter back into the amplifier, which can cause distortion of the signal and potential damage to the amplifier. In addition to an increase in the Bill Of Materials (BOM), the insertion of the isolator also reduces the radiated output power, which is equivalent to the insertion loss of the isolator.

A more elaborate approach to overcome antenna mismatch is the insertion of a tunable matching network between the power amplifier and the antenna. This robust solution to maximize the output power requires tunable discrete components that tend to be bulky, expensive, and result in non-negligible insertion losses, even when driving a perfectly matched load. Further, such components are typically not available in Complimentary Metal-Oxide Semiconductor (CMOS) integrated technologies.

A number of analog adaptive techniques have also been developed to automatically adjust transmit gain based on power or voltage that are detected to go into the load. However, these techniques require dedicated analog circuitry and do not allow for a programmable EVM target.

These adaptive techniques rely on reducing the bias current of the amplifier, which reduces the gain and prevents signal clipping. However, reducing the bias current also reduces the linear dynamic range of the amplifier, which causes increased distortion and EVM. The increased distortion and EVM have become more of a concern as requirements for supporting high data rate modulations increase.

SUMMARY

The present disclosure has been made to address at least the above problems and/or disadvantages and to provide at least the advantages described below. Accordingly, an aspect of the present disclosure provides a method for implementing a back-off policy to keep a constant EVM in the case of antenna mismatch.

According to an aspect of the present disclosure, a method is provided for adjusting a transmission gain in a transmitter of an electronic device. A transmitted signal is received at a digital signal processor (DSP) of the transmitter. The transmitted signal is also transmitted through a transmission path of the transmitter resulting in a load impedance. A looped-back signal is received at the DSP via a loop-back path of the transmitter that returns from the transmission path. The DSP estimates the load impedance from the transmitted signal and the looped-back signal. The DSP sets the transmission gain of the transmission path based on the load impedance and saturation values for a load current and a load voltage.

According to another aspect of the present disclosure, an apparatus is provided for adjusting a transmission gain in a transmitter of an electronic device. The apparatus includes a first plurality of circuit components comprising a transmission path for transmitting a transmitted signal and resulting in a load impedance. The apparatus also includes a second plurality of circuit components comprising loop-back path that returns a looped-back signal from the transmission path. The apparatus further includes a DSP configured to receive the transmitted signal and the looped-back signal, estimate the load impedance from the transmitted signal and the looped-back signal, and set the transmission gain of the transmission path based on the load impedance and saturation values for a load current and a load voltage.

According to a further aspect of the present disclosure, a non-transitory computer readable medium is provided with computer executable instructions stored thereon executed by a processor to perform the method of adjusting a transmission gain in a transmitter of an electronic device. The method includes receiving a transmitted signal. The transmitted signal is also transmitted through a transmission path of transmitter resulting in a load impedance. The method also includes receiving a looped-back signal via a loop-back path of the transmitter that returns from the transmission path. The method further includes estimating the load impedance from the transmitted signal and the looped-back signal. The method additionally includes setting the transmission gain of the transmission path based on the load impedance and saturation values for a load current and a load voltage.

BRIEF DESCRIPTION OF THE DRAWINGS

The above and other aspects, features and advantages of the present disclosure will be more apparent from the following description when taken in conjunction with the accompanying drawings, in which:

FIG. 3 is a flowchart illustrating a method of adjusting transmission gain in a transmitter of an electronic device, according to an embodiment of the present disclosure.

DETAILED DESCRIPTION OF EMBODIMENTS OF THE PRESENT DISCLOSURE

Figure 1:
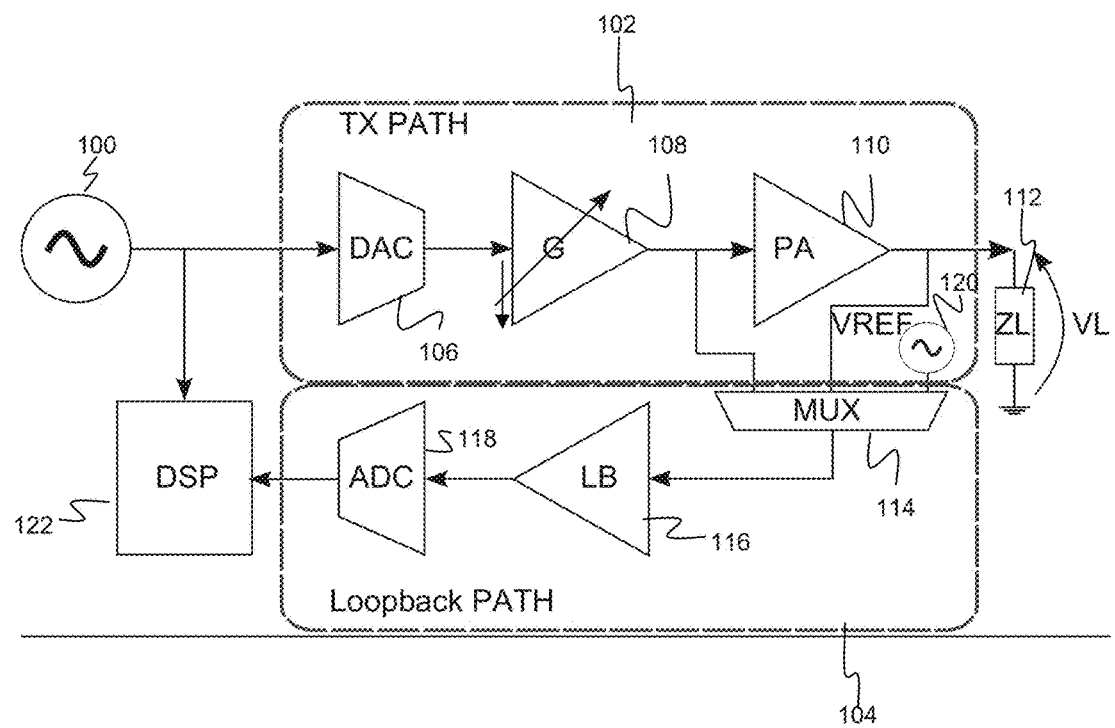
FIG. 1 is a diagram illustrating a circuit architecture including a loop-back path, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms and words used in the following description and claims are not limited to their dictionary meanings, but are merely used to enable a clear and consistent understanding of the invention. Accordingly, it should be apparent to those skilled in the art that the following description of embodiments of the present disclosure are provided for illustrative purposes only and not for the purpose of limiting the invention, as defined by the appended claims and their equivalents.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

It is to be understood that the singular forms "a," "an," and "the" include plural referents unless the context clearly dictates otherwise. Thus, for example, reference to "an identifier" includes reference to one or more such identifiers.

In the present disclosure, it should be understood that the terms "include" or "have" indicate existence of a feature, a number, a step, an operation, a structural element, parts, or a combination thereof, and do not exclude the existence or probability of additional one or more other features, numerals, steps, operations, structural elements, parts, or combinations thereof.

Embodiments of the present disclosure solve the problem of antenna mismatch using DSP techniques, which allow for a predictably-bounded and programmable transmitted EVM, while avoiding the use of dedicated matching networks and external components, such as, for example, isolators and tunable inductors or capacitors.

Specifically, embodiments of the present disclosure make use of a loop-back path that senses the voltage exercised into the load while transmitting a known signal. By measuring the time-varying amplitude of the looped-back signal, the transmitter is able to derive both the amplitude and the phase-shift of the looped-back signal. When the amplitude and the phase-shift are known, they can be used with the source impedance and the source voltage of the amplifier to derive the complex load impedance.

Load voltage and current can be derived from the load impedance. Assuming EVM that is dependent upon clipping of both voltage and current on the load, it is possible to set the transmission gain so that neither the voltage nor the current exceed their saturation values. Accordingly, a Transmit-Power-Control (TPC) policy may be defined based on meeting a target EVM requirement.

FIG. 1 is a diagram illustrating a circuit architecture including a loop-back path, according to an embodiment of the present disclosure.

The circuit architecture of FIG. 1 includes a transmitted signal 100, a transmission path 102, and a loop-back path 104. The transmission path 102 includes a Digital-to-Analog Converter (DAC) 106, a programmable gain amplifier 108, and a Power Amplifier (PA) 110. The programmable gain may be implemented in either a digital or an analog domain. The PA has a fixed nominal gain. Other components, which may be included in a radio transmitter architecture (i.e., an up-conversion mixer), may not be required for embodiments of the present invention.

The DAC 106 may be provided with a base-band waveform that is a constant-envelope complex tone generator, as shown in Equation (1), if the loop-back path 104 is a Cartesian demodulator with a quadrature downmixer. The DAC 106 may be provided with a base-band waveform that is an envelope-modulated sine wave, as shown in Equation (2), if the loop-back path 104 is an envelope demodulator.

$$x(t)=e^{j\omega_{IF}t} \quad (1)$$

$$x(t)=A(t)\cdot\sin(\omega_{IF}t) \quad (2)$$

where t is time, $\omega_{IF}$ is an angular frequency of the intermediate frequency (IF) signal, and A(t) is envelope modulation.

A load impedance $Z_L$ 112 is applied, which is influenced by the elements of the transmission path 102 from the chip to the antenna, including matching components, switches, and filters.

The loop-back path 104 includes a multiplexer (MUX) 114, a Loop Back amplifier (LB) 116, and an Analog-to-Digital Converter (ADC) 118. The loop-back path 104 may also include a down-mixer. The loop-back path 104 detects the time-varying amplitude of an input signal, so that its amplitude and phase-shift with respect to the source signal can be evaluated. The loop-back path 104 may be a dedicated loop-back path, may use an available receiving (RX) path, or may use a dedicated envelope modulator.

The MUX 114 allows the voltage output from the PA 110 to be compared with a reference voltage ($V_{REF}$) 120, by selecting one of the output voltage and the $V_{REF}$ 120. The $V_{REF}$ 120 must be stable over Process, Voltage, and Temperature (PVT) variations.

Both the transmitted signal 100, which is input to the transmission path 102, and a signal output from the feedback path 104 are provided to a DSP 122, which may be implemented as hardware, software, or a combination of hardware and software. The DSP 122 evaluates the static amplitude of the loop-back signal $|V_L|$ and the phase shift between the transmitted and the looped-back signals, $\phi_L$.

The phase shift $\phi_L$ may be extracted by comparing the time-delay between the source generator signal $V_S(t)$ and the load voltage $V_L(t)$. The phase shift $\phi_L$ will contain phase shift contributions due to the delays introduced by both the transmit phase shift $\phi_{TX}$ and the loop-back phase shift $\phi_{LB}$, which must be taken into account. The transmit phase shift $\phi_{TX}$ and the loop-back phase shift $\phi_{LB}$ can be known by design or may be measured as the round-trip delay phase shift $\phi_{LO}$ when the load is matched ($Z_L=Z_{LO}$), resulting in Equation (3) below.

$$\phi_{LO}=\phi_{TX}+\phi_{LB} \quad (3)$$

Embodiments of the present disclosure estimate the load impedance using the amplitude and the phase of the voltage on the load. Once the load impedance is known, the load current and load voltage can also be estimated. When an EVM is assumed that is correlated to clipping both the voltage and the current on the load to $V_{SAT}$ and $I_{SAT}$, respectively, the maximum gain that can be applied to match the target EVM can be estimated using a simple EVM model.

In order to simplify the calculation, the load amplitude is indirectly inferred in the digital domain from the gain $G_{REF}$ that must be applied to the transmission path 102 in order to match $V_{REF}$. However, the transmit gain is sensitive to parameters other than load impedance, such as, for example, temperature, process variation, and operating frequency. Therefore, a reference measure of transmit gain in well-defined known conditions (i.e., matched impedance, T=25° C., f=2.442 GHz) is required.

In further simplifying the calculation, the load saturation voltage and the load saturation current can be expressed as gain coefficients $G_{VSAT}$ and $G_{ISAT}$, respectively, characterized under particular load conditions, when EVM matches the target EVM.

Figure 2:
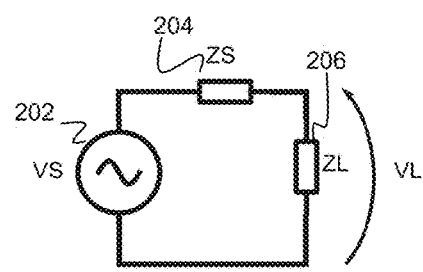
FIG. 2 is a diagram illustrating a simplified transmission path of FIG. 1, according to an embodiment of the present disclosure.

Accordingly, the transmit path of FIG. 1 may be more simplistically represented as set forth in FIG. 2, according to an embodiment of the present invention.

As shown in FIG. 2, a source voltage $V_S$ 202 has a variable amplitude controlled by the programmable gain amplifier. A source impedance $Z_S$ 204 may be known through measurement or design. A load impedance $Z_L$ 206 is to be estimated.

A complex voltage $V_L$ on the load impedance $Z_L$ 206 is expressed as set forth in Equation (4), with the source voltage Vs as a phase reference.

$$V_L = |V_L| \cdot e^{j(\phi_L - \phi_{LO})} \quad (4)$$

A definition of the load impedance $Z_L$ is set forth in Equation (5) below.

$$Z_L \triangleq \frac{V_L}{I_L} \quad (5)$$

Further, a definition of the load current $I_L$ is set forth in Equation (6) below.

$$I_L = \frac{V_S - V_L}{Z_S} \quad (6)$$

Thus, the load impedance $Z_L$ is derived as a function of two measurable variables, i.e., the static amplitude $|V_L|$ of the loop-back signal and the phase shift $\phi_L$ between the transmitted signal and the loop-back signal, as set forth in Equation (7) below.

$$Z_L = \frac{Z_S \cdot |V_L| \cdot e^{j(\varphi_L - \varphi_{LO})}}{V_S - |V_L| \cdot e^{j(\varphi_L - \varphi_{LO})}} \quad (7)$$

Due to PVT variations, both the source voltage $V_S$ and the source impedance $Z_S$ may vary on a per-device basis. An indirect method that characterizes the device based on the matched load $Z_{LO}$ tracks the variations.

Regardless of PVT, it is possible to provide an accurate RF voltage reference $V_{REF}$ that can be compared to the signal levels in the chain. $V_S$ can be regulated by means of the transmit gain G as set forth in Equation (8).

$$V_S = V_{LSB} \cdot G \quad (8)$$

$V_{LSB}$ is a voltage step resulting from each gain step. Thus, $G_{REF}$ is defined as set forth in Equation (9).

$$G_{REF} \triangleq G|_{V_S| = V_{VREF}} \quad (9)$$

Substituting $G_{REF}$ into Equation (8) results in Equation (10).

$$V_{REF} = V_{LSB} \cdot G_{REF} \quad (10)$$

From Equation (10), the gain step, or voltage step, $V_{LSB}$ can be derived as set forth in Equation (11).

$$V_{LSB} = \frac{V_{REF}}{G_{REF}} \quad (11)$$

By substituting Equation (11) into Equation (8) the source voltage $V_S$ can be obtained as a result of the generic applied gain G, as shown in Equation (12).

$$V_S = \frac{V_{REF}}{G_{REF}} \cdot G \quad (12)$$

Similarly, when applying the matched load $Z_{LO}$, which can be chosen close to the nominal impedance value of 50Ω, to the device, a digital gain for matched load is set forth in Equation (13).

$$G_{LO} \triangleq G|_{V_L| = V_{REF}, Z_L = Z_{LO}} \quad (13)$$

With the above-described conditions, which result in ($\phi_L = \phi_{LO}$ if $Z_L = Z_{LO}$), the load impedance $Z_L$ of Equation (7) can be simplified as set forth in Equation (14).

$$Z_{L0} = \frac{Z_S \cdot V_{REF}}{\frac{V_{REF}}{G_{REF}} \cdot G_{L0} - V_{REF}} \quad (14)$$

Accordingly, as set forth in Equation (15):

$$\frac{Z_S}{Z_{L0}} = \frac{G_{L0}}{G_{REF}} - 1 \quad (15)$$

Defining the gain $G_L$ as the gain that must be applied for $V_L$, to match $V_{REF}$ ($|V_L| = V_{REF}$), when the generic load impedance $Z_L$ is applied, results in Equation (16). However, this may not be achievable for all load conditions, e.g., a short circuit.

$$G_L(Z_L) \triangleq G|_{V_L| = V_{REF}} \quad (16)$$

Accordingly, Equation (7) may be written as Equation (17) below.

$$Z_L = \frac{Z_s \cdot V_{REF} \cdot e^{j(\varphi_L - \varphi_{L0})}}{\frac{V_{REF}}{G_{REF}} \cdot G_L - V_{REF} \cdot e^{j(\varphi_L - \varphi_{L0})}} \quad (17)$$

When both sides of Equation (17) are divided by $Z_{LO}$, $$\frac{Z_S}{Z_{L0}}$$

is substituted from Equation (15), and $V_{REF}$ is simplified, Equation (18) is derived, as set forth below.

$$\frac{Z_L}{Z_{L0}} = \frac{\left(\frac{G_{L0}}{G_{REF}} - 1\right) \cdot e^{j(\varphi_L - \varphi_{L0})}}{\frac{G_L}{G_{REF}} - e^{j(\varphi_L - \varphi_{L0})}} \quad (18)$$

Using Equation (18), a generic applied impedance $Z_L$ may be estimated from the gain $G_L$ and the phase delay $\phi_L$ observed by the chip, provided that an initial characterization on a known reference impedance $Z_{LO}$ results in a similarly evaluated gain $G_{LO}$ and phase $\phi_{LO}$.

In general, an amplifier can provide a limited maximum voltage $V_{SAT}$ and a limited maximum current $I_{SAT}$, which, when exceeded by increasing the transmit gain by too much, results in higher signal distortion and increased EVM. In order to define a gain control policy that provides constant EVM over impedance variations, it is necessary to guarantee that the load voltage and the load current will not exceed the saturation values, as set forth in Equation (19).

$$\begin{cases} |V_S| < V_{SAT} \\ |I_L| < I_{SAT} \end{cases} \quad (19)$$

Despite the fact that $V_{SAT}$ and $I_{SAT}$ could be known by design, the two saturation phenomena are always present to some extent, and depending on the likeliness of signal clipping (i.e., saturation), EVM will be degraded. Therefore, saturation values must be defined that correlate with the target EVM ($EVM_T$).

For example, the EVM due to voltage and current may be limited to $\sqrt{2}$ less than the target EVM to ensure that the target EVM is not exceeded for any load conditions, as set forth in Equation (20).

$$EVM_T = \sqrt{EVM_V^2 + EVM_I^2} = \sqrt{2} \cdot EVM_V \text{ (assuming } EVM_V = EVM_I) \quad (20)$$

This is further expressed in dB in Equation (21) below.

$$EVM_{V'} = EVM_T - 3 \text{ dB} \quad (21)$$

Assuming EVM will be limited mostly by $V_{SAT}$ when $Z_L = Z_{MAX}$ ($|Z_{MAX}| > |Z_{LO}|$), and EVM will be limited mostly by $I_{SAT}$ when $Z_L = Z_{min}$ ($|Z_{\downarrow MIN}| < |Z_{\downarrow LO}|$), the saturation voltages and currents are defined as set forth in Equation (22).

$$\begin{cases} V_{SAT} \triangleq V_L |_{EVM=EVM_V, Z_L=Z_{MAX}} \\ I_{SAT} \triangleq I_L |_{EVM=EVM_I, Z_L=Z_{min}} \end{cases} \quad (22)$$

$Z_{MAX}$ and $Z_{MIN}$ can be derived by defining a maximum tolerable Voltage Standing Wave Ratio (VSWR), as set forth in Equation (23).

$$\frac{Z_{MAX}}{Z_0} = VSWR, \quad \frac{Z_{min}}{Z_0} = \frac{1}{VSWR} \quad (23)$$

Thus, the saturation values may be defined as set forth in Equation (24).

$$\begin{cases} V_S = \frac{V_{REF}}{G_{REF}} \cdot G \\ I_L = V_S \cdot \frac{1}{Z_L + Z_S} \end{cases} \quad (24)$$

Through a substitution of Equations (12), (15), and (18), Equation (25) results, as set forth below.

$$\begin{cases} \dfrac{V_S}{V_{REF}} = \dfrac{G}{G_{REF}} \\ \dfrac{I_L}{\left(\dfrac{(V)_{REF}}{Z_{L0}}\right)} = \dfrac{G}{G_{REF}} \cdot \dfrac{1}{\left(\dfrac{G_{L0}}{G_{REF}} - 1\right) + \dfrac{Z_L}{Z_{L0}}} \end{cases} \quad (25)$$

By applying Equation (22), $V_{SAT}$ and $I_{SAT}$ may be indirectly estimated in Equation (28) from the saturation gains in Equation (27).

$$\begin{cases} G_{VSAT} \triangleq G |_{EVM=EVM_V, Z_L=Z_{MAX}} \\ G_{ISAT} \triangleq G |_{EVM=EVM_I, Z_L=Z_{min}} \end{cases} \quad (27)$$

$$\begin{cases} \dfrac{V_S}{V_{REF}} = \dfrac{G_{VSAT}}{G_{REF}} \\ \dfrac{I_{SAT}}{\left(\dfrac{(V)_{REF}}{Z_{L0}}\right)} = \dfrac{G_{ISAT}}{G_{REF}} \cdot \dfrac{1}{\left(\dfrac{G_{L0}}{G_{REF}} - 1\right) + \dfrac{Z_{min}}{Z_{L0}}} \approx \dfrac{\dfrac{G_{ISAT}}{G_{REF}}}{\dfrac{G_{L0}}{G_{REF}} - 1} \end{cases} \quad (\ldots 28)$$

The condition of Equation (29) is imposed, which is normalized as shown in Equation (30).

$$\begin{cases} |V_S(G)| < V_{SAT} \\ |I_L(G)| < I_{SAT} \end{cases} \quad (29)$$

$$\begin{cases} \dfrac{|V_S(G)|}{V_{REF}} < \dfrac{G_{VSAT}}{G_{REF}} \\ \dfrac{|I_L(G)|}{\left(\dfrac{(V)_{REF}}{Z_{L0}}\right)} < \dfrac{\dfrac{G_{ISAT}}{G_{REF}}}{\dfrac{G_{L0}}{G_{REF}} - 1} \end{cases} \quad (30)$$

By substituting Equation (18) into Equation (25), Equation (31) is obtained, as set forth below.

$$\dfrac{I_L}{\left(\dfrac{(V)_{REF}}{Z_{L0}}\right)} = \dfrac{\dfrac{G}{G_L}}{\left(\dfrac{G_{L0}}{G_{REF}} - 1\right)} \cdot \left[\dfrac{G_L}{G_{REF}} - e^{j(\varphi_L - \varphi_{L0})}\right] \quad (31)$$

By replacing the left side of Equation (30) with the right side of Equation (31) and rearranging, Equation (32) is obtained, as set forth below.

$$\begin{cases} G < G_{VSAT} \\ G < G_{ISAT} \cdot \left| \dfrac{\dfrac{G_L}{G_{REF}}}{\dfrac{G_L}{G_{REF}} - e^{j(\varphi_L - \varphi_{L0})}} \right| \end{cases} \quad (32)$$

Therefore, Equation (33) can be defined, from which an EVM-compliant target gain $G_T$ may be chosen, as set forth in Equation (34).

$$\begin{cases} G_{VSAT} \triangleq G_{VMAX} \\ G_{ISAT} \cdot \left| \dfrac{\dfrac{G_L}{G_{REF}}}{\dfrac{G_L}{G_{REF}} - e^{j(\varphi_L - \varphi_{L0})}} \right| \triangleq G_{IMAX} \end{cases} \quad (33)$$

$$G_T = \min(G_{VMAX}, G_{IMAX}) \quad (34)$$

The above-described equations are valid in a general case where the phase variation $\varphi_L - \varphi_{LO}$ between the voltage on the generic load $Z_L$ and the reference load $Z_{LO}$ may be estimated. However, retrieving the phase information requires dedicated hardware components, such as, for example, a quadrature feedback path (i.e., a down-conversion mixer), and DSP processing capabilities allowing for a coherent input-output operation, which may not be as easily available as simple amplitude-feedback (which could be obtained by a less complex Amplitude Modulation (AM)-demodulator). Therefore, in another embodiment of the present disclosure, pessimistic assumptions are made with respect to the phase information, and thus, the phase information is not required.

Accordingly, the minimum possible value is chosen for $G_{IMAX}$ in Equation (33), which becomes Equation (35) below, and the control policy of Equation (34) is still valid.

$$\begin{cases} G_{VSAT} \triangleq G_{VMAX} \\ G_{ISAT} \cdot \dfrac{G_L}{G_L + G_{REF}} \triangleq G_{IMAX} \end{cases} \quad (35)$$

FIG. 3 is a flowchart illustrating a method of adjusting transmission gain in a transmitter of an electronic device, according to an embodiment of the present disclosure.

Referring to FIG. 3, it is assumed that a system is calibrated with a known load, allowing $G_{REF}$ and $\varphi_{LO}$ to be determined. The DSP of the transmitter receives a transmit signal prior to a transmission path, in step 302. The transmit signal is also transmitted through a transmission path of the transmitter. In step 304, the DSP receives a looped-back signal via a loop-back path of the transmitter. The loop-back path returns from the transmission path, and the looped-back signal is chosen from an output of the power amplifier of the transmission path and a reference voltage, as shown in FIG. 1.

In step 306, the DSP measures a time-varying amplitude of the looped-back signal. Steps 304 and 306 are iterative, and the gain will be adjusted until the amplitude of the looped signal matches $V_{REF}$. The final gain is $G_L$. In step 308, the DSP derives an amplitude and a phase shift of the looped-back signal from the time-varying amplitude.

In step 310, the DSP obtains a source impedance and a source voltage from the transmitted signal. In step 312, the DSP estimates the load impedance from the amplitude of the looped-back signal, the phase shift of the looped-back signal, the source impedance, and the source voltage. In step 314, the DSP derives the load voltage and the load current of the transmitted signal from the load impedance. Steps 310, 312, and 314 may not be explicitly performed, when just the gain and phase measurements are required to set an appropriate gain, as shown above in Equations (33) and (34).

In step 316, the transmission gain is set so that the saturation values for the load current and the load voltage are not exceeded.

Embodiments of the present disclosure correct antenna mismatch using DSP techniques, allowing for predictably-bounded and programmable transmitted EVM, while avoiding the use of dedicated matching networks, and external components, such as, for example, isolators and tunable inductors/capacitors.

Embodiments of the present disclosure are advantageous in that there are no external components required, there is no dedicated analog circuitry required, and the PA bias current is not used to modulate transmission gain.

A hardware implementation of a computer system may be implemented in accordance with a processor, a memory, input/output devices, a network interface, and a computer bus.

The term "processor", as used herein, is intended to include any processing device, such as, for example, one that includes a Central Processing Unit (CPU) and/or other processing circuitry. It is also to be understood that the term "processor" may refer to more than one processing device and that various elements associated with a processing device may be shared by other processing devices.

The term "memory", as used herein, is intended to include a memory associated with a processor or CPU, such as, for example a Random Access Memory (RAM), a Read Only Memory (ROM), a fixed memory device (e.g., a hard drive), a removable memory device, a flash memory, etc.

In addition, the phrase "input/output devices", as used herein, is intended to include, for example, one or more input devices for entering information, and/or one or more output devices for outputting information.

Software components including instructions or code for performing the methodologies described herein, may be stored in one or more of the associated memory devices (e.g., ROM), and when ready to be utilized, loaded in part or in whole (e.g., into the RAM) and executed by a CPU. Specifically, a non-transitory computer readable medium may be provided with computer executable instructions stored thereon and executed by a processor to perform the methods of embodiments of the present invention.

The present disclosure may be utilized in conjunction with the manufacture of integrated circuits, which are considered part of this invention.

While the disclosure has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method of adjusting a transmission gain in a transmitter of an electronic device, the method comprising:

receiving a transmitted signal at a digital signal processor (DSP) of the transmitter, the transmitted signal also being transmitted through a transmission path of the transmitter resulting in a load impedance;

receiving a looped-back signal at the DSP via a loop-back path of the transmitter that returns from the transmission path;

estimating, at the DSP, the load impedance from the transmitted signal and the looped-back signal; and setting, by the DSP, the transmission gain of the transmission path based on the load impedance and saturation values for a load current and a load voltage.

2. The method of claim 1, wherein the transmission path comprises at least a digital-to-analog converter, a programmable gain amplifier, and a power amplifier.

3. The method of claim 2, wherein the looped-back path comprises at least a multiplexer and an analog-to-digital converter.

4. The method of claim 3, wherein the multiplexer allows a comparison of output of the power amplifier and a reference voltage, by selecting the looped-back signal from one of the output of the power amplifier and the reference voltage.

5. The method of claim 1, wherein estimating the load impedance comprises:

measuring a time-varying amplitude of the looped-back signal;

deriving an amplitude and a phase shift of the looped-back signal from the time-varying amplitude;

setting the transmit gain based on the amplitude of the looped-back signal, the phase shift of the looped-back signal, a source impedance, and a source voltage.

6. The method of claim 1, wherein setting the transmission gain comprises:

deriving the load current of the transmitted signal from the load impedance; and setting the transmission gain so that the resulting saturation values for the load current and the load voltage are not exceeded.

7. The method of claim 6, wherein the transmission gain is set to a maximum value permitted to match a target Error Vector Magnitude (EVM) without exceeding the resulting saturation values for the load current and the load voltage.

8. The method of claim 1, wherein the loop-back path is one of a dedicated loop-back path, a receiving path, and a dedicated envelope demodulator.

9. The method of claim 5, wherein the amplitude is inferred from a gain applied to the transmission path to match a reference voltage.

10. The method of claim 1, wherein a constant Error Vector Magnitude (EVM) is provided over load impedance variations.

11. An apparatus for adjusting a transmission gain in a transmitter of an electronic device, the apparatus comprising:

a first plurality of circuit components comprising a transmission path for transmitting a transmitted signal and resulting in a load impedance;

a second plurality of circuit components comprising a loop-back path that returns a looped-back signal from the transmission path; and a digital signal processor (DSP) configured to receive the transmitted signal and the looped-back signal, estimate the load impedance from the transmitted signal and the looped-back signal, and set the transmission gain of the transmission path based on the load impedance and saturation values for a load current and a load voltage.

12. The apparatus of claim 11, wherein the first plurality of circuit components comprises at least a digital-to-analog converter, a programmable gain amplifier, and a power amplifier.

13. The apparatus of claim 12, wherein the second plurality of circuit components comprises at least a multiplexer and an analog-to-digital converter.

14. The apparatus of claim 13, wherein the multiplexer is configured to allow comparison of output of the power amplifier and a reference voltage, by selecting the looped-back signal from one of the output of the power amplifier and the reference voltage.

15. The apparatus of claim 11, wherein, in estimating the load impedance, the DSP is further configured to:

measure a time-varying amplitude of the looped-back signal;

derive an amplitude and a phase shift of the looped-back signal from the time-varying amplitude; and setting the transmit gain based on the amplitude of the looped-back signal, the phase shift of the looped-back signal, the source impedance, and the source voltage.

16. The apparatus of claim 11, wherein, in setting the transmission gain, the DSP is further configured to:

derive the load current resulting from the transmitted signal from the load impedance; and set the transmission gain so that the saturation values for the load current and the load voltage are not exceeded.

17. The apparatus of claim 16, wherein the transmission gain is set to a maximum value permitted to match a target Error Vector Magnitude (EVM) without exceeding the saturation values for the load current and the load voltage.

18. The apparatus of claim 11, wherein the loop-back path is one of a dedicated loop-back path, a receiving path, and a dedicated envelope demodulator.

19. The apparatus of claim 15, wherein the amplitude is inferred from a gain applied to the transmission path to match a reference voltage.

20. A non-transitory computer readable medium with computer executable instructions stored thereon executed by a processor to perform the method of adjusting a transmission gain in a transmitter of an electronic device, the method comprising:

receiving a transmitted signal, the transmitted signal also being transmitted through a transmission path of the transmitter resulting in a load impedance;

receiving a looped-back signal via a loop-back path of the transmitter that returns from the transmission path;

estimating the load impedance from the transmitted signal and the looped-back signal; and setting the transmission gain of the transmission path based on the load impedance and saturation values for a load current and a load voltage.

* * * * *